(12) United States Patent
Kobayashi et al.

(10) Patent No.: US 6,400,904 B1
(45) Date of Patent: Jun. 4, 2002

(54) FOCUSING DEVICE OF CAMERA

(75) Inventors: Hideo Kobayashi; Osamu Inaba, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/643,907

(22) Filed: Aug. 23, 2000

(30) Foreign Application Priority Data

Aug. 23, 1999 (JP) ............................................. 11-235979

(51) Int. Cl.⁷ .......................... G03B 13/00; G03B 13/02
(52) U.S. Cl. ........................................ 396/144; 396/373
(58) Field of Search ................................. 396/144, 373, 396/378, 379

(56) References Cited

U.S. PATENT DOCUMENTS 5,266,992 A * 11/1993 Takaoka et al. ............... 396/84
5,539,490 A * 7/1996 Kang et al. .................. 396/348
5,628,037 A * 5/1997 Tsuyuki et al. .............. 396/140

FOREIGN PATENT DOCUMENTS

JP          9197491          7/1997

* cited by examiner

*Primary Examiner*—David M. Gray
*Assistant Examiner*—Rochelle Blackman
(74) *Attorney, Agent, or Firm*—Birch, Stewart, Kolasch & Birch, LLP

(57) ABSTRACT

A housing of a finder unit is attached to a camera body and cam follower pins of movable lenses are engaged with grooves of a finder cam provided in the camera body. The housing is moved back and forth in this state along a guide bar attached to the camera body. Thereby, a position of a view frame of a view frame switch unit, which serves as an image forming part of the finder unit, is adjusted with respect to the movable lenses so that the focus of the finder unit is adjusted.

11 Claims, 7 Drawing Sheets

F I G. 3
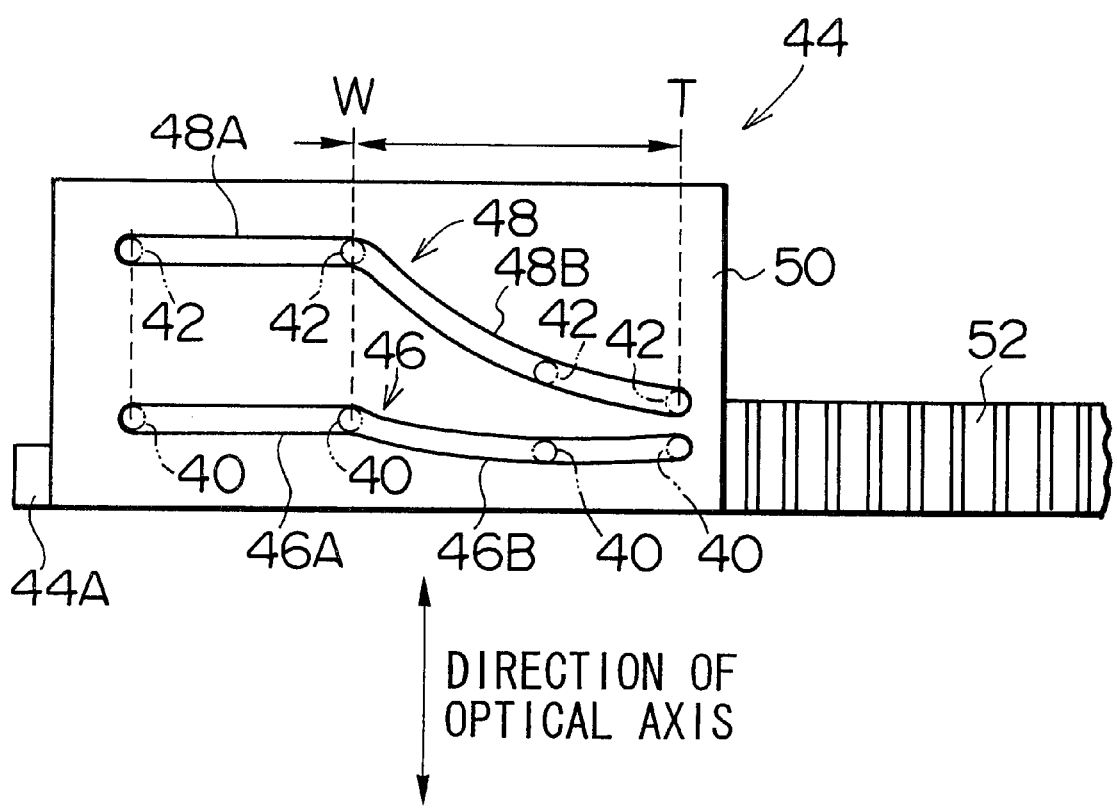

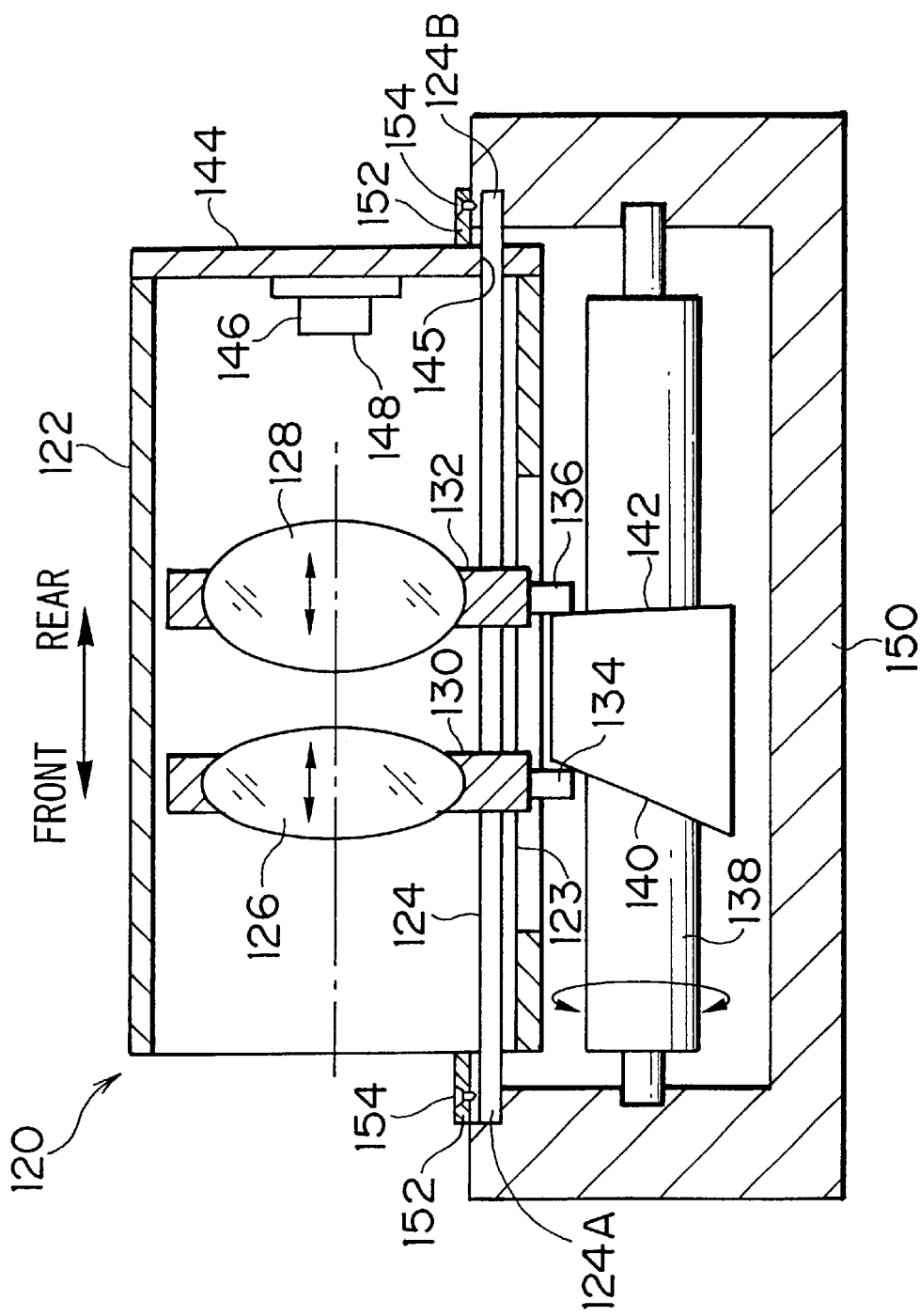

FOCUSING DEVICE OF CAMERA

BACKGROUND OF THE INVENTION

1. Field of the Invention

The present invention relates to a focusing device of a camera, more specifically to a focusing device of a camera that can easily adjust the focus of an optical unit of the camera such as a finder optical unit and a taking lens optical unit when assembling the optical unit.

2. Description of Related Art

Japanese Patent Application Laid-open No. 9-197491 discloses a finder optical system of a camera. In the optical system, lenses are held in lens frames, which are movably supported by a guide bar attached to a housing. A cam cylinder is arranged at a side of the lenses, and cam faces of the cam cylinder are engaged with the lens frames. The cam cylinder is rotated so that the lens frames can be moved back and forth along the cam faces so as to change a focal length of the optical system.

As a focusing structure of the finder optical system, a cam moving structure is applied. More specifically, the cam cylinder is moved back and forth with respect to the housing so that the entire lenses are moved back and forth, so as to adjust positions of the lenses along the optical axis and to thereby adjust the focus.

However, the conventional focusing structure requires many parts such as a pressing member for pressing the cam cylinder in a predetermined direction, and a moving member for moving back and forth the cam cylinder against the pressing force of the pressing member. Hence, the conventional focusing structure has a troublesome process to be assembled.

SUMMARY OF THE INVENTION

The present invention has been developed in view of the above-described circumstance, and has as its object the provision of the focusing device of a camera that can reduce the number of parts and be easily assembled.

In order to achieve the above-described object, the present invention is directed to a focusing device of a camera, comprising: a camera body; a cam member provided to the camera body; and a lens optical unit attached to the camera body, the lens optical unit including: a housing, a guide member provided by to the housing, a lens movable along the guide member, and an image forming part attached to the housing, wherein focus of the lens optical unit is adjusted by moving the housing with respect to the camera body in a state where the lens is engaged with the cam member.

According to the present invention, the lens optical unit is attached to the camera body and the lens of the lens optical unit is engaged with the cam member at the camera side. As moving the housing of the lens optical unit in this state, the position of the image forming part of the lens optical unit is adjusted while the lens is being fixed. Thus, the focus can be adjusted by only moving the housing. After the focusing, the housing is securely fixed to the camera body. Therefore, the focusing device of the present invention can be assembled without adding extra parts.

Moreover, if the focusing device of the present invention is applied to a finder optical unit and a taking lens optical unit, the focusing device for the finder optical unit and the photographing optical unit can be easily assembled.

Preferably, the guide member comprises a guide rod inserted through the housing, at least one of ends of the guide rod being supported by the camera body, the housing being guided by the guide rod when the housing is moved. In this structure, the housing is moved along the guide bar, which is also the guide member of the lens, and the housing is thus accurately moved along the optical axis of the lens. In a case where a plurality of lenses such as an objective lens and an eyepiece are attached to the housing in addition to the lens, the housing is moved in a state where the optical axes of the lenses correspond with each other; hence the optical accuracy is improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is an expanded view of a finder cam in the finder unit in FIG. 2;

FIG. 7 is an exemplary view showing a taking lens optical system to which a focusing device according to an embodiment of the present invention is applied.

DETAILED DESCRIPTION OF THE PREFERRED EMBODIMENT

Hereunder a preferred embodiment of a focusing device of a camera of the present invention will be described according to the accompanying drawings.

Figure 1:
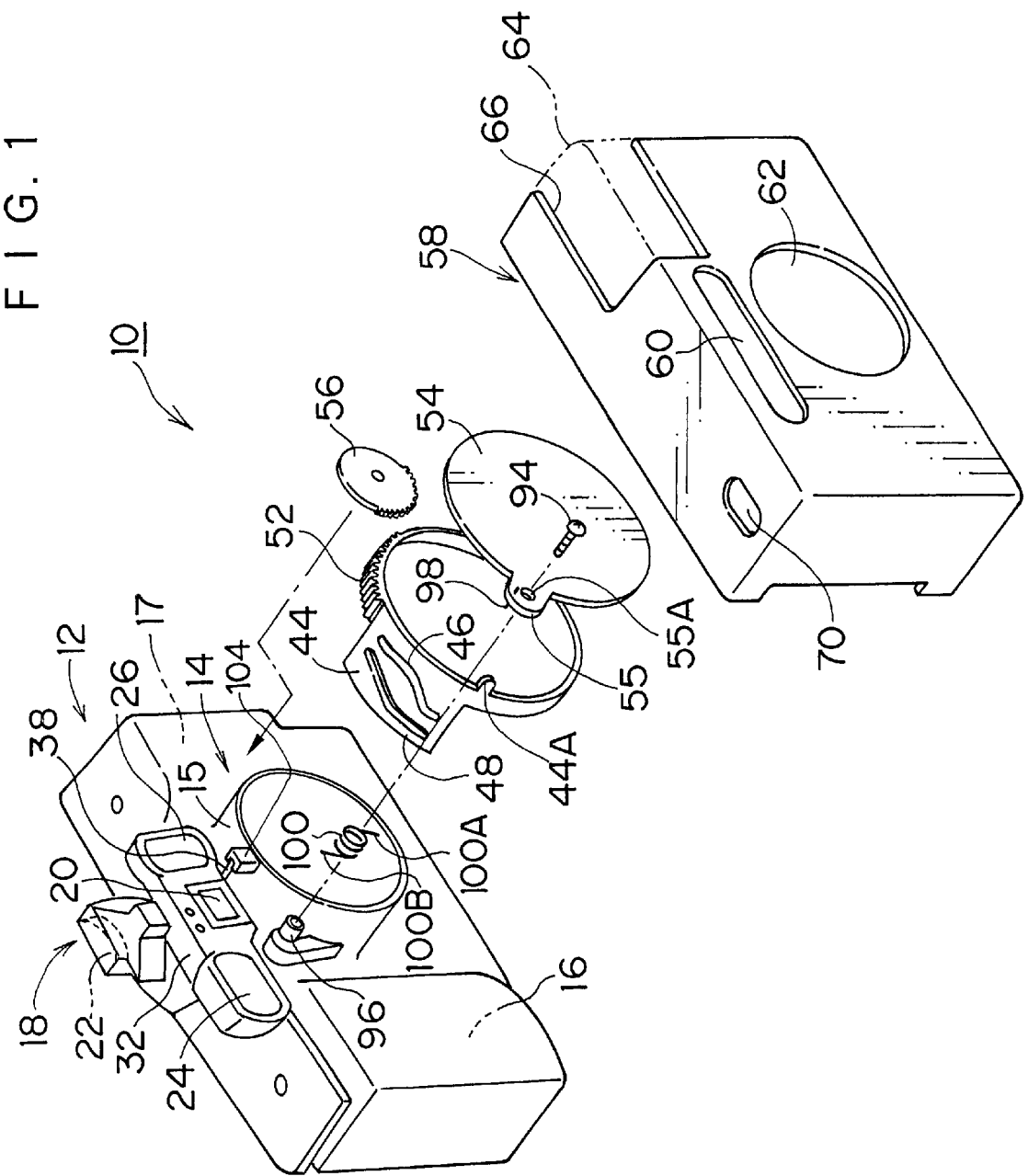
FIG. 1 is an exploded perspective view of a camera to which a focusing device according to an embodiment of the present invention is applied.

FIG. 1 is an exploded perspective view showing a camera 10 to which a focusing device of a camera according to an embodiment of the present invention is applied. The camera 10 in FIG. 1 uses silver halide film; however a camera to which the focusing device of the present invention is applied is not limited to the camera using the silver halide film. The focusing device may be applied to a digital camera, which captures an image of a subject with a solid-state imaging device.

A camera body 12 is formed like a rectangular parallelepiped which is longer in sides, and a fixed cylinder 14 for holding a zoom lens barrel (not shown) is provided to the substantially central part of the front of the camera body 12. The fixed cylinder 14 may be unitedly formed with the camera body 12, or may be separately formed and attached to the camera body 12 at the time of assembly. A film cartridge chamber 16 is formed at the left side of the fixed cylinder 14 in FIG. 1, and a film wind-up chamber 17 is formed at the right side of the fixed cylinder 14 in FIG. 1.

A housing 18 of a finder unit, corresponding to a lens optical unit of the present embodiment, for holding the finder optical system and so forth is attached to the camera body 12 above the fixed cylinder 14. An attaching method for the housing 18 will be described later. An objective lens 20 of the finder optical system is fixed to an opening formed at a substantially the center of the front of the housing 18.

Figure 2:
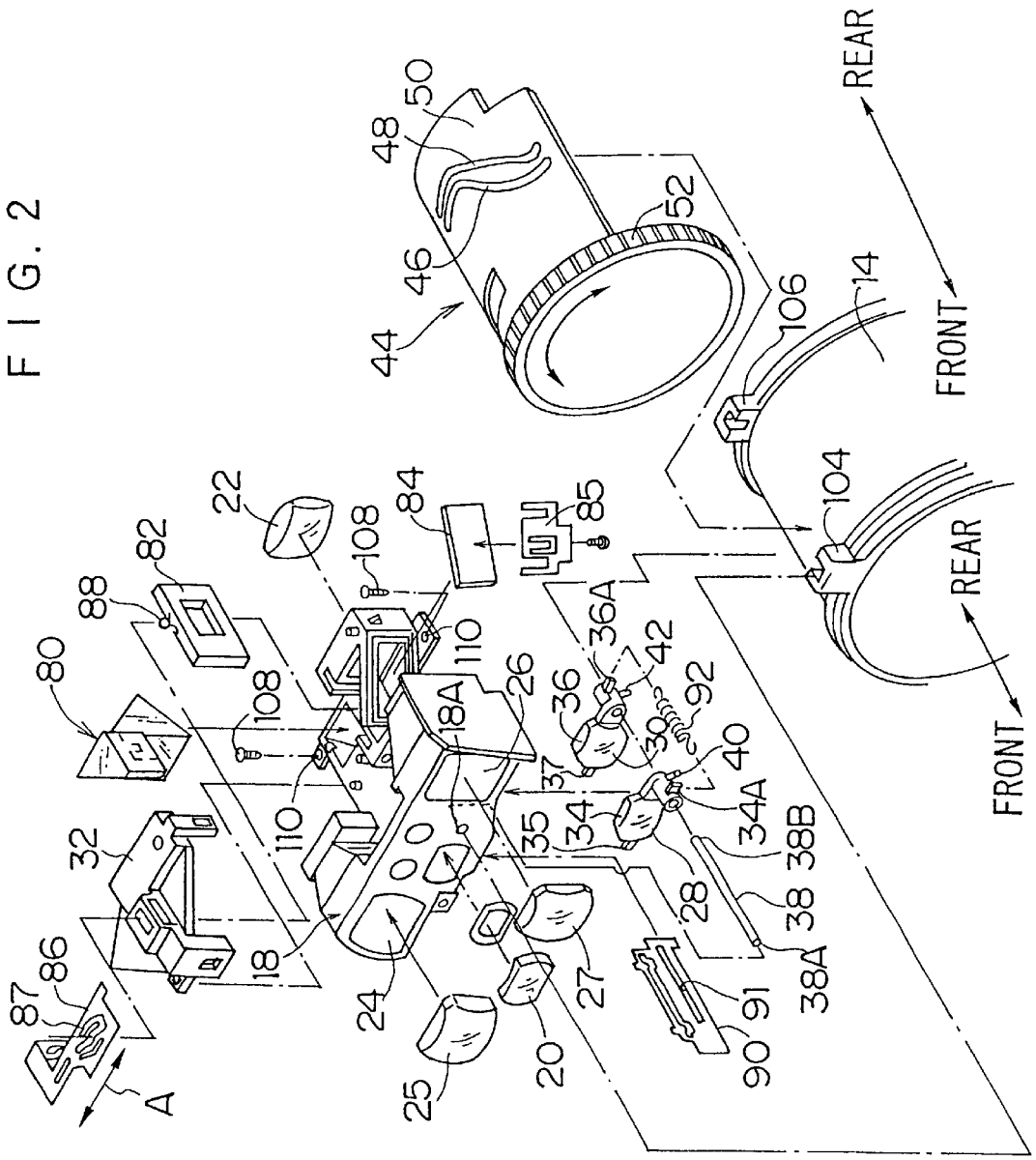
FIG. 2 is an exploded perspective view of a finder unit in the camera in FIG. 1.

An eyepiece 22 of the finder optical system is fixed at the rear of the objective lens 20 to an opening formed at the back of the housing 18. Windows 24 and 26 for autofocus (AF) measurement are formed at the housing 18 at the sides of the objective lens 20. As shown in FIG. 2, a lens 25 of an AF light-receiving part is attached to the AF window 24, and a lens 27 of an AF light-projecting part is attached to the AF window 26. The AF light-projecting part and the AF light-receiving part compose an AF measurement part for measuring a subject distance. The AF measurement part obtains the subject distance based on the principle of triangulation, and a result of the measurement is referred for AF control.

In the finder optical system, members are arranged between the objective lens 20 and the eyepiece 22 in an order from the front to the rear along the finder optical axis: a front movable lens 28, a rear movable lens 30, a prism 80, a view frame switch unit 82, and a reflective mirror 84. These optical members 28, 30, 80, 82, and 84 are contained and arranged at a predetermined position of a finder optical system container, which is formed between the housing 18 and a cover 32.

Light entering in the finder optical system from the objective lens 20 enters in the prism 80 through the movable lenses 28 and 30. The light is reflected for a few times in a predetermined direction within the prism 80, and then a subject image is formed on an image forming part or a view frame of the view frame switch unit 82. The subject image is reflected by the reflective mirror 84 and is converted in an erect image, then is viewed through the eyepiece 22. A reference number 85 is a plate spring for fixing the reflective mirror 84 to the housing 18. A reference number 86 is a view frame switch lever, on the surface of which an oblique groove 87 is formed, and a drive pin 88 of the view frame switch unit 82 is fitted in the oblique groove 87. When the lever 86 is slid straightly along an arrow A in FIG. 2, the drive pin 88 is moved back and forth along the oblique groove 87, whereby the view frame switch unit 82 is driven and the view frame is switched among convention (C), high-vision (H), and panoramic (P) sizes.

The movable lenses 28 and 30 are held in lens holding frames 34 and 36, respectively. The lens holding frames 34 and 36 are supported by a guide bar 38 movably back and forth. The guide bar 38 is attached to the housing 18 in parallel with the finder optical axis. Guide pins 35 and 37 are projected in a horizontal direction at the left part of the lens holding frames 34 and 36 in FIG. 2, respectively. The guide pins 35 and 37 are slidably fitted in a straight groove 91, which is formed at a cam plate 90, which is mounted on the housing 18.

At the right part of the front movable lens holding frame 34 and the rear movable lens holding frame 36 in FIG. 2, cam follower pins 40 and 42 are projected in an downwardly inclined direction, respectively. The cam follower pins 40 and 42 are fitted with grooves 46 and 48, respectively, of a cam member or a finder cam 44, which is rotatably fitted with the fixed cylinder 14. The finder cam 44 comprises a cam plate body 50 in a form of a warped roof tile, which has the cam grooves 46 and 48 formed on its surface, and a ring gear 52, which is formed unitedly with the cam plate body 50. The lens holding frames 34 and 36 are pressed in a direction to bring them closer to each other by the pressing force of a pulling spring 92, which is hooked between hooks 34A and 36A, which are formed at the right side of the lens holding frames 34 and 36, respectively. The cam follower pins 40 and 42 are tightly fitted with the cam grooves 46 and 48 by the pressing force.

As shown in FIG. 3, the grooves 46 and 48 of the cam plate body 50 comprise straight grooves 46A and 48A and non-straight grooves 46B and 48B, respectively. The straight grooves 46A and 48A are used when opening and closing an inner barrier 54 (refer to FIGS. 4 and 5) for protecting the taking lens, and are formed perpendicularly to the optical axis in FIG. 3. Hence, the cam follower pins 40 and 42 do not move in the direction of the optical axis while they go through the straight grooves 46A and 48A. In other words, the front and rear movable lens holding frames 34 and 36 do not move in the direction of the optical axis while opening and closing the inner barrier 54.

The cam grooves 46B and 48B serve to move the front and rear movable lens holding frames 34 and 36 back and forth in the direction of the optical axis so that the subject image in a magnification corresponding with a photographing magnification can be viewed from the eyepiece 22. The front and rear movable lens holding frames 34 and 36 move back and forth along the cam grooves 46B and 48B while the cam follower pins 40 and 42 go through the cam grooves 46B and 48B. Thereby, the subject image in the magnification corresponding with the photographing magnification can be viewed from the eyepiece 22.

Figure 4:
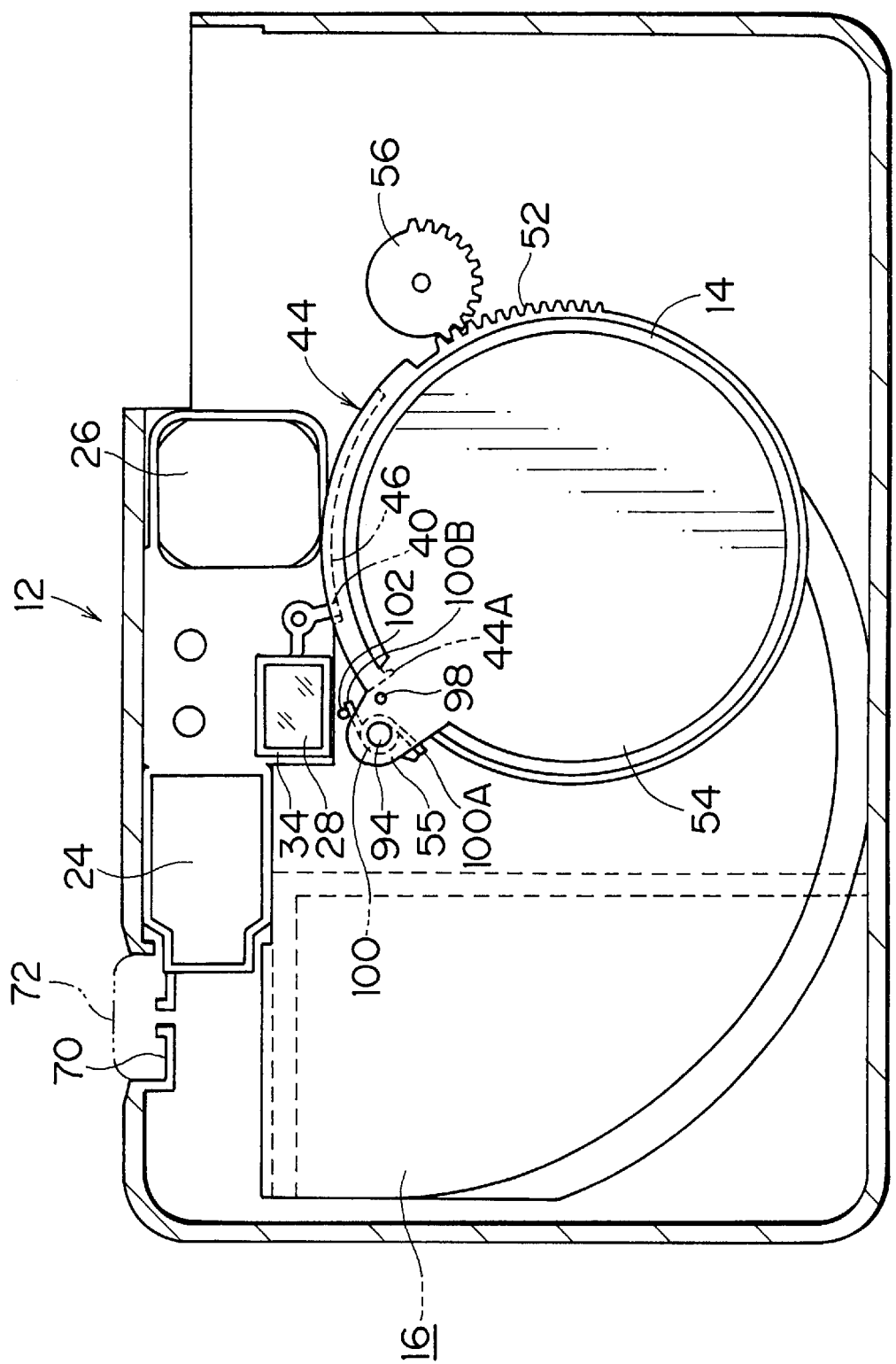
FIG. 4 is a front view of the camera in a state where an inner barrier is closed.
Figure 5:
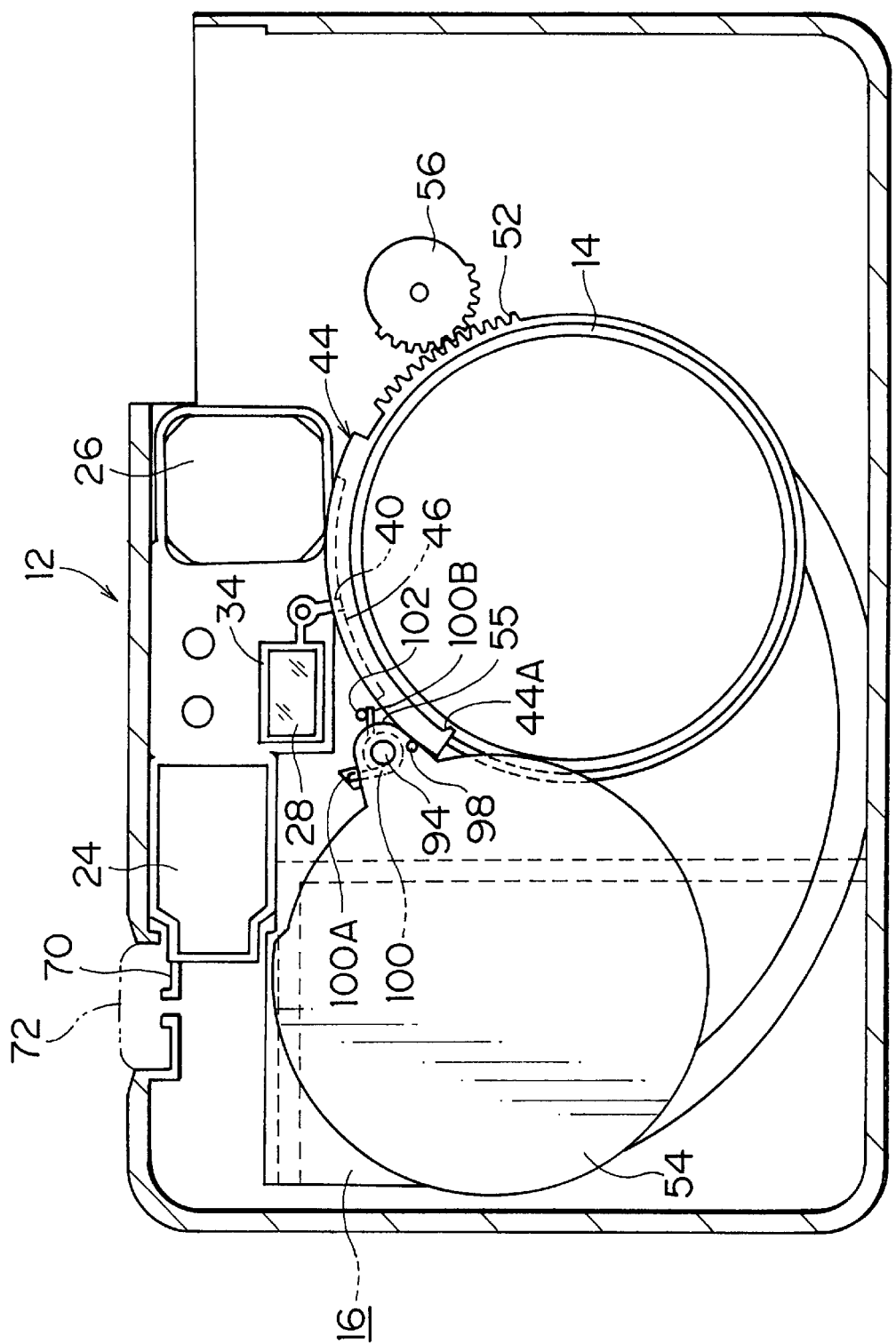
FIG. 5 is a front view of the camera in a state where the inner barrier is opened.

The gear 52 of the finder cam 44 is geared with a drive gear 56, which is attached to the camera body 12 as shown in FIGS. 4 and 5. The drive gear 56 is connected with a motor (not shown) via a reduction mechanism. Thus, when driving the motor to drive the drive gear 56 in a forward/backward direction, a rotation force of the drive gear 56 is transmitted to the finder cam 44, and the finder cam 44 rotates in a clockwise/counterclockwise direction along the outer periphery of the fixed cylinder 14. The inner barrier 54 is thereby opened and closed, and the front and rear movable lens holding frames 34 and 36 move back and forth in the direction of the optical axis along the cam grooves 46B and 48B for zooming.

At the front of the camera body 12, which is constructed as described above, a front cover 58 is attached as shown in FIG. 1. The front cover 58 has openings at a portion 62, which faces the fixed cylinder 14, and a portion 60, which faces the objective lens 20 of the finder optical system and the AF windows 24 and 26. The opening 62, facing the fixed cylinder 14, is closed with the inner barrier 54 when not in use. An opening 66 for containing a pop-up electronic flash case 64, which is shown with an alternate long and two short dashes line, is formed at the upper right corner of the cover 58 in FIG. 1. A reference number 70 in FIG. 1 is an opening for arranging a shutter release switch 72, which is shown with an alternate long and two short dashes line in FIGS. 4 and 5.

The drive mechanism of the inner barrier 54 comprises the finder cam 44, the drive gear 56, and the motor (not shown) for driving the drive gear 56. In short, the drive mechanism of the movable lens holding frames 34 and 36 of the finder optical system serves concurrently as the drive mechanism of the inner barrier 54.

The inner barrier 54 is formed like a disk so as to cover the front of the fixed cylinder 14 and to close the opening 62 of the front cover 58. A tab 55 is formed at a periphery of the inner barrier 54, and a pin 94 is inserted in an opening 55A formed at the tab 55 as shown in FIG. 1. The pin 94 is fitted in a bearing 96, which is projected from the camera body 12. The inner barrier 54 is turned back and forth around the pin 94 in a range between the closing position in FIG. 4 to the opening position in FIG. 5.

As shown in FIG. 1, a pin 98 is provided to the tab 55 of the inner barrier 54. A twisted coil spring 100 is attached on the bearing 96, and one end 100A of the twisted coil spring 100 is engaged with the tab 55, while the other end 100B is engaged with a pin 102 in a state of being pressed by the pin 102, which is provided to the front face of the camera body 12 as shown in FIGS. 4 and 5. By attaching the twisted coil spring 100 as described above, the pressing force of the twisted coil spring 100 is transmitted to the inner barrier 54 via the tab 55. Thereby, the inner barrier 54 is held to the camera body 12 while being always pressed in a closing direction.

In the closed state of the inner barrier 54 shown in FIG. 4, the pin 98 is in contact with a bent portion 44A of the finder cam 44. If the finder cam 44 is rotated counterclockwise in FIG. 4 in this state, the pin 98 is pressed by the bent portion 44A and the inner barrier 54 is rotated clockwise around the pin 94; then the inner barrier 54 positions at the opening position in FIG. 5 as the inner barrier 54 is rotated in a predetermined angle after the pin 98 rides on the bent portion 44A. Thus, the opening 62 of the front cover 58 in FIG. 1 is fully opened, and the camera 10 is in a state of photographing.

Figure 6:
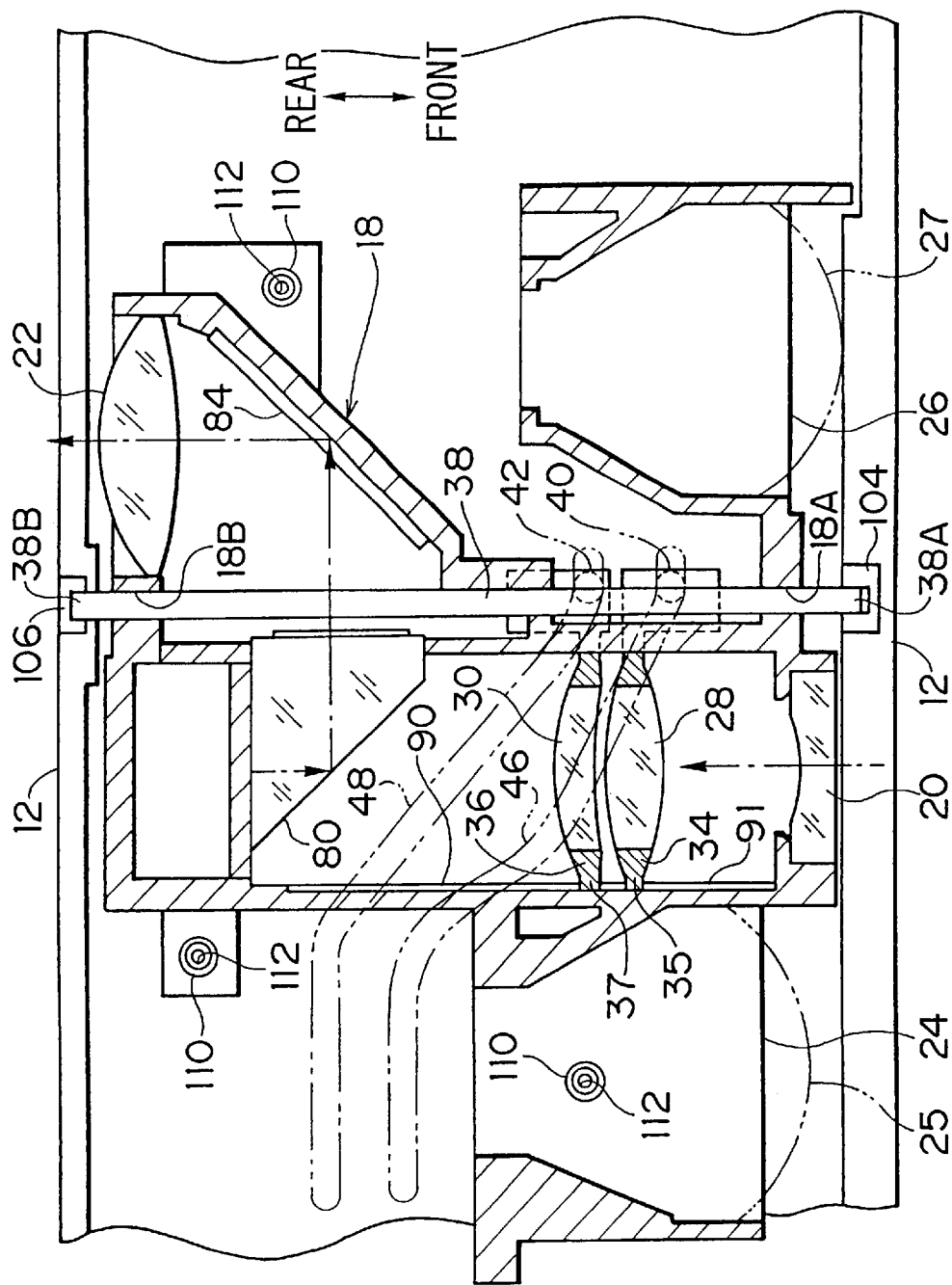
FIG. 6 is a section view of the focusing device of the finder unit.

Next, a focusing device for the finder unit with respect to the camera body 12 will be described. As shown in FIG. 6, the focusing device has a structure in which the guide bar 38, which supports the movable lenses 28 and 30, also supports the housing 18 of the finder unit movably back and forth.

A front end 38A of the guide bar 38 is inserted through an insertion hole 18A (see FIGS. 2 and 6), which is formed in the front face of the housing 18, and is engaged with a bearing 104 in a receding shape, which is formed at the front of the fixed cylinder 14. A rear end of 38B of the guide bar 38 in FIG. 6 is inserted into an insertion hole 18B, which is formed in the back face of the housing 18, and is engaged with a bearing 106 in a receding shape, which is formed at the back of the camera body 12.

As shown in FIG. 6, three through holes 110 are formed in the housing 18 at predetermined positions for receiving fixing screws 108 (shown in FIG. 2). The through holes 110 are formed with a larger diameter than that of the screws 108, and are positioned to face screw holes 112, which are formed at the top face of the camera body 12, when mounting the housing 18 on the camera body 12. The housing 18 is fixed at the camera body 12 by screwing the screws 108 into the screw holes 112 through the through holes 110. Moreover, as loosening the screw 108, the housing 18 can be moved back and forth along the guide bar 38 by the amount of a clearance between the screws 108 and the through holes 112, whereby the attaching position of the housing 18 with respect to the camera body 12 can be adjusted.

A focus adjusting method by the finder unit will be described.

First, the housing 18 of the finder unit is attached to the camera body 12, and the cam follower pins 40 and 42 of the movable lenses 28 and 30 are engaged with the grooves 46 and 48 of the finder cam 44, respectively. In this state, the housing 18 is loosely fixed to the camera body 12 with the screws 108.

Then, the housing 18 is moved back and forth along the guide bar 38 using the clearance between the screws 108 and the through holes 110. Thereby, the housing 18 is moved in the state where the movable lenses 28 and 30 are engaged with the finder cam 44, so that the position of the view frame of the view frame switch unit 82 as the image forming part of the lens optical unit is adjusted with respect to the movable lenses 28 and 30, and the focus is thus adjusted. According to the focusing device in the present embodiment, the focus can be adjusted by moving only the housing 18 back and forth. After the focusing, the screws 108 are further screwed into the camera body 12 so as to tightly fix the housing 18 to the camera body 12.

Therefore, the focusing device of the present embodiment does not require additional parts to be assembled, and thus can be easily assembled. Moreover, the device of the present embodiment can adjust the focus without rotating the finder cam 44, hence the device can be applied to a plate cam such as the finder cam 44.

In the focusing device of the present embodiment, the guide bar 38 of the movable lenses 28 and 30 supports the housing 18; thus the housing 18 can be moved back and forth accurately in parallel with the optical axis of the movable lenses 28 and 30. The housing 18 can be moved back and forth in the state where the optical axes of the movable lenses 28 and 30, the objective lens 20, the eyepiece 22 and the prism 80; thus the optical precision is improved.

In the present embodiment, the guide bar 38 movably supports the housing 18; however the present invention is not limited to such support. For example, a first guide member that is exclusively used for the housing 18 may be formed, and a second guide member is formed at the camera body for guiding the first guide member movably along the optical axis of the finder, so that the housing 18 is supported movably back and forth by the operation of the first and second guide members.

FIG. 7 is a section view showing an example where the focusing device of the lens optical unit according to an embodiment of the present invention is applied to a zoom lens apparatus 120.

In a lens barrel 122 of the zoom lens apparatus 120, a guide bar 124 is arranged in parallel with an optical axis of the zoom lens apparatus 120 indicated by a chain line in FIG. 7, and lens frames 130 and 132 of movable lenses 126 and 128 are supported by the guide bar 124 movably back and forth. Cam follower pins 134 and 136 are projected at the lens frames 130 and 132, respectively. The cam follower pin 134 is engaged with a cam face 140 of a cam member or a side cam shaft 138 through a slit 123 of the lens barrel 122, and the cam follower pin 136 is engaged with a cam face 142 of the side cam shaft 138 through the slit 123. Thus, as the side cam shaft 138 is rotated, the movable lenses 126 and 128 are moved back and forth along the cam faces 140 and 142, respectively, and the zooming is thereby performed. Through the zoom lens apparatus 120, a subject image is formed on an image forming part or a light-receiving face 148 of a solid-state imaging device 146, which is fixed to a rear end 144 of the lens barrel 122.

As shown in FIG. 7, the guide bar 124 is inserted through the lens barrel 122. A front end 124A of the guide bar 124 is attached to a camera body 150, and a rear end 124B of the guide bar 124 is attached to the camera body 150 through a hole 145, which is formed at the rear end 144 of the lens barrel 122. The lens barrel 122 is supported by the guide bar 124 movably back and forth, and the lens barrel 122 with the imaging device 146 is moved back and forth when the focus is adjusted.

By the above-described construction, the lens barrel 122 can be moved in the state where the movable lenses 126 and 128 are engaged with the side cam shaft 138; thus the position of the image-forming part 148 of the imaging device 146 as the image forming part of the zoom lens apparatus 120 is adjusted with respect to the movable lenses 126 and 128, so that the focus is adjusted.

The focusing device in FIG. 7 can adjust the focus by only moving the lens barrel 122 back and forth. After adjusting the focus, flanges 152, which are formed at the front and rear ends of the lens barrel 122, are fixed to the camera body 150 with screws 154 so that the lens barrel 122 is securely fixed to the camera body 150.

According to the focusing device of a camera of the present invention, after attaching the lens optical unit to the camera body, the focusing can be performed by moving the housing of the lens optical unit while the lens of the lens optical unit is engaged with the cam member at the camera body side. Thus, the focusing device of the present invention can be easily assembled, and can perform the focusing without moving the cam member of the lens optical unit.

In the present invention, further, the front and rear ends of the guide bar as the guide member of the lens optical unit are supported at the camera body, and the housing is movably supported by the guide bar. Therefore, the housing can be moved accurately along the optical axis of the lens and thus the optical precision is improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A focusing device of a camera, comprising:
    a camera body;
    a cam member coupled with the camera body; and
    a lens optical unit attached to the camera body, the lens optical unit including
        a housing,
        a guide member coupled to the housing,
        a lens movable along the guide member, and
        an image forming part attached to the housing,
    wherein the focus of the lens optical unit is adjusted by moving the housing with respect to the camera body in a state where the lens is engaged with the cam member, the adjustment being fixed by fixing the housing to the camera body.

2. The focusing device of a camera as defined in claim 1, wherein the lens optical unit is one of a finder optical unit and a taking lens optical unit.

3. The focusing device of a camera as defined in claim 1, wherein the guide member comprises a guide rod inserted through the housing, at least one of ends of the guide rod being supported by the camera body, the housing being guided by the guide rod when the housing is moved.

4. A method for focusing a camera prior to use, the camera including a camera body, the method comprising:
    engaging a lens with a cam member, the lens and the cam member associated with a lens optical unit;
    moving a housing associated with the lens optical unit relative to the camera body such that the lens is moved using the cam member and a focus associated with the lens optical unit is adjusted thereby during assembly of the camera; and
    fixing the housing relative to the camera body so as to fix the focus adjustment during the assembly of the camera;
    wherein the lens optical unit further includes a guide member coupled to the housing; and wherein the lens is movable along the guide member.

5. The method of claim 4, wherein the cam member includes cam grooves and wherein the step of moving further includes directing the lens along the cam grooves so as to adjust the focus of the lens optical unit.

6. The method according to claim 4, wherein the lens optical unit is one of a finder optical unit and a taking lens optical unit.

7. The method of claim 4, wherein the guide member includes a guide rod inserted through the housing, at least one of the ends of the guide rod being supported by the camera body, the housing being guided by the guide rod when the housing is moved.

8. A focusing device in a camera having a camera body, the focusing device comprising:
    a lens optical unit coupled to the camera body, the lens optical unit including a housing, a guide member coupled to the housing, and a lens movable along the guide member; and
    a cam member communicating with the lens optical unit such that the focus of the lens optical unit is adjusted by moving the housing in relation to the camera body during assembly of the camera and wherein the housing is fixed relative to the camera body so as to fix the focus adjustment during an assembly of the camera.

9. The focusing device according to claim 8, wherein the cam member includes cam grooves such that the focus of the lens optical unit is adjusted by directing the lens along the cam grooves when the housing is moved in relation to the camera body.

10. The focusing device according to claim 8, wherein the lens optical unit is one of a finder optical unit and a taking lens optical unit.

11. The focusing device according to claim 8, wherein the guide member includes a guide rod inserted through the housing, at least one of the ends of the guide rod being supported by the camera body, the housing being guided by the guide rod when the housing is moved.

* * * * *